(12) United States Patent
O'Brien

(10) Patent No.: US 9,032,998 B2
(45) Date of Patent: May 19, 2015

(54) METHOD AND APPARATUS FOR COMMUNICATING IRRIGATION DATA

(75) Inventor: Mike O'Brien, Carlsbad, CA (US)

(73) Assignee: DIG Corporation, Vista, CA (US)

( * ) Notice: Subject to any disclaimer, the term of this patent is extended or adjusted under 35 U.S.C. 154(b) by 594 days.

(21) Appl. No.: 13/473,296

(22) Filed: May 16, 2012

(65) Prior Publication Data

US 2013/0306749 A1 Nov. 21, 2013

(51) Int. Cl.
| | |
|---|---|
| *F16K 31/48* | (2006.01) |
| *F17D 3/00* | (2006.01) |
| *F16K 31/00* | (2006.01) |
| *G05B 11/00* | (2006.01) |
| *F16K 31/12* | (2006.01) |
| *A01G 25/00* | (2006.01) |
| *A01G 27/00* | (2006.01) |
| *B05B 12/08* | (2006.01) |
| *H02J 7/04* | (2006.01) |
| *H02J 7/16* | (2006.01) |
| *H02J 7/00* | (2006.01) |
| *G05D 7/00* | (2006.01) |
| *A01G 25/16* | (2006.01) |

(52) U.S. Cl.
CPC ..................................... *A01G 25/16* (2013.01)

(58) Field of Classification Search
CPC ..... A01G 25/16; A01G 25/165; A01G 27/00; A01G 27/001; A01G 27/003; H02J 7/0031; G05B 2219/2625; B05B 12/00; B05B 12/004; B05B 12/02
USPC ............. 700/282–284; 137/78.1–78.3, 487.5, 137/624.11, 624.12; 239/63, 67, 69, 70, 99; 320/127, 128, 134, 137, 139, 141, 145
See application file for complete search history.

(56) References Cited

U.S. PATENT DOCUMENTS

| | | |
|---|---|---|
| 3,313,939 A | 4/1967 | Cyril |
| 3,860,863 A | 1/1975 | Lamprecht |
| 4,245,286 A | 1/1981 | Paulkovich et al. |
| 4,847,546 A | 7/1989 | Bobier et al. |
| 4,980,574 A | 12/1990 | Cirrito |
| 5,229,649 A | 7/1993 | Nielsen et al. |
| 5,402,303 A | 3/1995 | Luck et al. |
| 5,661,349 A | 8/1997 | Luck |
| 5,801,519 A | 9/1998 | Midya et al. |
| 5,960,813 A | 10/1999 | Sturman et al. |
| 6,104,759 A | 8/2000 | Carkner et al. |
| 6,257,264 B1 | 7/2001 | Sturman et al. |
| 6,312,191 B1 | 11/2001 | Rosenfeld |
| 6,452,499 B1 | 9/2002 | Runge et al. |

(Continued)

*Primary Examiner* — Crystal J Barnes-Bullock
(74) *Attorney, Agent, or Firm* — Knobbe Martens Olson & Bear LLP

(57) ABSTRACT

Methods and systems control an irrigation system that includes an irrigation controller, a valve actuator, and at least one irrigation sensor connected by a communication circuit. A sensor charging pulse having a temporal duration less than a solenoid actuation time threshold for a solenoid is provided over the communication circuit. The sensor charging pulse charges a charge storage device in at least one irrigation sensor. A series of addressing pulses is also generated over the communication circuit, which indicate a device identifier of at least one irrigation sensor. The series of addressing pulses activate at least one irrigation sensor having the device identifier indicated by the series of addressing pulses such that the activated irrigation sensor provides a sensor signal indicative of an irrigation condition to the irrigation controller via the communication network.

19 Claims, 10 Drawing Sheets

(56) References Cited

U.S. PATENT DOCUMENTS

| | | |
|---|---|---|
| 6,617,832 B1 | 9/2003 | Kobayashi |
| 6,856,654 B1 | 2/2005 | Carkner et al. |
| 6,993,416 B2 | 1/2006 | Christiansen |
| 7,010,394 B1 | 3/2006 | Runge et al. |
| 7,558,650 B2 | 7/2009 | Thornton et al. |
| 2006/0032938 A1 | 2/2006 | Pomey |
| 2006/0202051 A1 | 9/2006 | Parsons et al. |
| 2007/0074767 A1* | 4/2007 | Roffey ................ 137/487.5 |
| 2007/0162188 A1 | 7/2007 | Bailey et al. |
| 2008/0249664 A1 | 10/2008 | Runge et al. |
| 2009/0222141 A1 | 9/2009 | Ensworth et al. |
| 2011/0006736 A1* | 1/2011 | Robinson et al. ............ 320/134 |

* cited by examiner

METHOD AND APPARATUS FOR COMMUNICATING IRRIGATION DATA

BACKGROUND

1. Field of the Invention

The present invention relates to irrigation control systems, and in particular to irrigation control systems that collect irrigation data from one or more sensors.

2. Description of the Related Technology

Irrigation systems are used widely in commercial and residential applications. Typical irrigation systems include an irrigation controller connected to one or more irrigation devices (e.g., valves) which provide water to desired locations via an assortment of hydraulic components (e.g., pipes, sprinkler heads, and drip lines). The irrigation controllers control the components to provide desired irrigation in accordance with a programmed schedule.

With some irrigation control systems, an operator determines the amount of water and the time at which the water should be applied by defining an irrigation schedule. The irrigation schedule may determine which valves are activated at which times, and for how long. Any changes to the irrigation schedule may be performed manually by the operator.

Other so called "smart" irrigation control systems receive input from sensors that indicate the nature of the environment being irrigated. This input may be used by the irrigation controller to determine how much irrigation is necessary in order to maintain the health of the installed plant life. For example, if the sensor input indicates there has been a recent rain storm, it may not be necessary to provide additional water via the irrigation system. Other input received by the irrigation controller may indicate the moisture present in the soil. Upon receiving the indication of soil moisture, the irrigation controller may determine an amount of irrigation needed to maintain soil moisture levels within a desired range that supports the installed plant life.

Other irrigation sensors may provide input on the flow rate of water through an irrigation supply line. By knowing the actual flow rate of the water, an irrigation controller may more precisely calculate the amount of water being applied during an irrigation program. Based on the needs of the installed plant life, the irrigation controller may extend or shorten the time a particular irrigation zone is active based on the flow rate of the water in the zone.

Irrigation controllers may collect data from these irrigation sensors via either wireless or wired connections. In some environments, wireless connections may have distance limitations, and so a wired connection may be favored. With existing irrigation controller solutions, use of wired sensors requires a dedicated wiring circuit for each sensor. In an irrigation zone including, for example, three sensors, three separate wiring circuits may be needed between the irrigation controller and the sensors in that irrigation zone. An irrigation zone may also include at least one valve actuator. The valve actuation may be performed by an electrical solenoid. A separate wired circuit between the irrigation controller and the solenoid may also be necessary. In such a configuration, four individual sets of wired connections may be needed for one irrigation zone. When one irrigation installation may include up to hundreds of individual zones, the need to provide a dedicated wiring circuit for each irrigation sensor and each water valve may be problematic. For example, when installing a new irrigation system, the need to possibly quadruple the number of wiring circuits necessary to install a smart irrigation system may add significant cost to the installation. Furthermore, when retrofitting legacy systems with smart irrigation controllers that utilize irrigation sensors, the need to install additional wiring may disrupt established ground cover. Additionally, the expense of installing additional wiring may be a significant proportion of the retrofitting cost, and may reduce adoption of smart irrigation systems when not required by law.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In one aspect, an irrigation control system includes a communication circuit, an irrigation controller including a processor configured to run an irrigation program, a signal generator configured to generate address information that identifies at least one irrigation sensor and to generate valve control signals for opening and closing an irrigation valve, wherein the irrigation controller is configured to communicate the address information and the valve control signals over the communication circuit, and a data collection module configured to process a sensor signal received via the communication circuit and to execute a control action based on the received sensor signal. The irrigation controller also includes at least one irrigation sensor connected to the communication circuit, each of the at least one irrigation sensors associated with a unique device identifier, the at least one sensor having a sensor device configured to provide a sensor signal indicative of an irrigation condition to the irrigation controller via the communication circuit, when the sensor device is activated, and a sensor controller configured to receive address information over the communication circuit, determine if the address information indicates the device identifier of the respective irrigation sensor, and if so activate the sensor device. The irrigation controller further includes a valve actuator configured to receive the valve control signals from the irrigation controller via the communication circuit and open or close a valve based on the valve control signals. The communication circuit consists of a first electrical connector and a second electrical connector each being connected to the irrigation controller, the at least irrigation sensor, and the valve actuator.

In some implementations of an irrigation control system the valve actuator includes a solenoid operably coupled to an irrigation valve, and the valve control signals include one or more solenoid actuation pulses and the valve actuator is configured to operate the solenoid to open or close the valve coupled thereto based on the one or more solenoid actuation pulses. The signal generator can be further configured to generate a sensor charging signal, and the irrigation controller can be configured to communicate the sensor charging signal to the at least one irrigation sensor using the first and second electrical connectors. In some implementations, the address information includes a series of addressing pulses.

In another implementation, an irrigation control system includes a communication circuit and an irrigation controller that includes a processor configured to run an irrigation program. The irrigation controller can further include an electrical signal generator that is configured to provide a sensor charging pulse to at least one irrigation sensor over the communication circuit, the sensor charging pulse having a temporal duration less than a solenoid actuation time threshold, provide one or more solenoid actuation pulses over the communication circuit, the one or more solenoid actuation pulses having a temporal duration longer than the solenoid actuation time threshold for a solenoid, and provide a series of addressing pulses over the communication circuit, the series of addressing pulses indicating a device identifier of one of the at least one irrigation sensors, each one of the series of addressing pulses having a temporal duration shorter than the solenoid actuation time threshold. The irrigation controller can further include a data collection module configured to process a sensor signal received via the communication circuit, wherein the irrigation controller is further configured to execute a control action based on the received sensor signal. The irrigation control system can further include at least one irrigation sensor connected to the communication circuit, each of the at least one irrigation sensors associated with a unique device identifier respectively, each irrigation sensor including a charge storage device, the irrigation sensor configured to receive the sensor charging pulse and charge the charge storage device using the sensor charging pulse. Each irrigation sensor can further include a sensor controller configured to receive the series of addressing pulses and determine if the series of addressing pulses indicates the device identifier of the respective irrigation sensor, the sensor controller further configured to activate the sensor device to provide a sensor signal if the series of addressing pulses indicates the device identifier of the respective irrigation sensor, and a sensor device configured to, when activated, provide a sensor signal indicative of an irrigation condition to the irrigation controller via the communication network.

In some implementations, the irrigation control system further includes a valve actuator that has a solenoid operably connected to an irrigation valve, the valve actuator configured to receive the one or more solenoid actuation pulses from the irrigation controller via the communication circuit, wherein the valve actuator actuates the solenoid to open or close a valve based on the solenoid actuation pulse. In some implementations, the irrigation control system include a communication circuit that consists of a first electrical connector (or first electrical path) and a second electrical connector (or second electrical path) connecting the irrigation controller, the at least irrigation sensor, and the at least one valve actuator. For example, the first and second electrical connectors can be two wires, and each of the irrigation controller, the sensors, and the valve actuator are connected to each or the two wires, but not otherwise electrically connected. The at least one irrigation sensor can be one of a rain sensor, a temperature sensor, a moisture sensor, humidity sensor, a radiation sensor, a flow sensor, and a wind sensor, or another type of irrigation sensor. In implementations that have more than one sensor, each of the sensors can be a rain sensor, a temperature sensor, a moisture sensor, humidity sensor, a radiation sensor, a flow sensor, or a wind sensor.

The duration of the signals (or pulses) communicated from the irrigation controller can vary to facilitate non-colliding communications. For example, the duration of the sensor charging pulse can be between about 1 millisecond and about 100 milliseconds. The series of addressing pulses can include between one and ten pulses, and wherein the irrigation controller provides the series of addressing pulses subsequent to a sensor charging pulse. The duration of the sensor charging pulse can be between about 5 milliseconds and about 25 milliseconds. The duration of the sensor charging pulse can be between 9 milliseconds and 11 milliseconds.

In some implementations, the at least one irrigation sensor includes a first irrigation sensor and a second irrigation sensor, wherein the first irrigation sensor is associated with a first device identifier and the second irrigation device is associated with a second device identifier. The irrigation control system can also include a third irrigation sensor, wherein the third irrigation sensor is associated with a third device identifier. The one or more solenoid actuation pulses can be bi-polar pulses. The valve actuator can include a pulse compression and polarity circuit to operate the solenoid. In some implementations, the series of addressing pulses each have a duration of less than one millisecond. In some implementations, the control action the irrigation controller performs includes one of raising an alarm signal, actuating a solenoid, deactuating a solenoid, delaying actuation of a solenoid, or adjusting an irrigation time.

In another implementation, a method of controlling an irrigation system having an irrigation controller, a valve actuator, and at least one irrigation sensor connected by a communication circuit, includes providing a sensor charging pulse over the communication circuit, the sensor charging pulse having a temporal duration less than a solenoid actuation time threshold for a solenoid, charging a charge storage device in at least one irrigation sensor using the sensor charging pulse, providing a series of addressing pulses over the communication circuit, the series of addressing pulses indicating a device identifier of one of the at least one irrigation sensors, and activating the at least one irrigation sensor having the device identifier indicated by the series of addressing pulses such that the activated irrigation sensor provides a sensor signal indicative of an irrigation condition to the irrigation controller via the communication circuit. The communication circuit can consists of a first conductive circuit and a second conductive circuit, the first and second conductive circuits each connected to the irrigation controller, the valve actuator, and each irrigation sensor, the irrigation controller communicates the sensor charging pulse and the series of addressing pulses to the at least one irrigation device using only the first and second conductive circuits, and the sensor device communicates the sensor signal to the irrigation controller using only the first and second conductive circuits. The method can further include receiving the sensor signal in the irrigation controller, and based on the received sensor signal, provide valve control signals to the valve actuator to open or close a valve. In some implementations the method can further include receiving the series of addressing pulses in the at least one irrigation sensor, and determining if the series of addressing pulses indicates the device identifier of the at least one irrigation sensor. In this method, the at least one irrigation sensor can include at least one of a rain sensor, a temperature sensor, a moisture sensor, humidity sensor, a radiation sensor, a flow sensor, and a wind sensor.

In another implementation, an irrigation control system includes an irrigation controller configured to run an irrigation program, the irrigation controller further configured to generate a sensor charging signal, generate address information that identifies irrigation sensors in communication with the irrigation controller, generate valve control signals to open and close an irrigation valve, and process a sensor signal received from an irrigation sensor via and to execute a control action based on the received sensor signal. The irrigation control system can also include a plurality of irrigation sensors each having a unique device identifier and configured to receive power from the sensor charging signal, each sensor having a sensor controller configured to receive address information from the irrigation controller and activate a sensor device if the address information indicates the identifier of the respective irrigation sensor, and a sensor device configured to, when activated, provide a signal indicative of an irrigation condition to the irrigation controller. The irrigation control system can yet further include a valve actuator configured to receive the valve control signals from the irrigation controller and open or close a valve based on the valve control signals, and a communication circuit consisting of a first wire and a second wire, the first and second wire electrically coupled to the irrigation controller, each of the plurality of irrigation sensors, and the valve actuator, wherein all communication between the irrigation controller, the plurality of irrigation sensors, and the valve actuator uses the first and second wire.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION OF CERTAIN EMBODIMENTS

Figure 1:
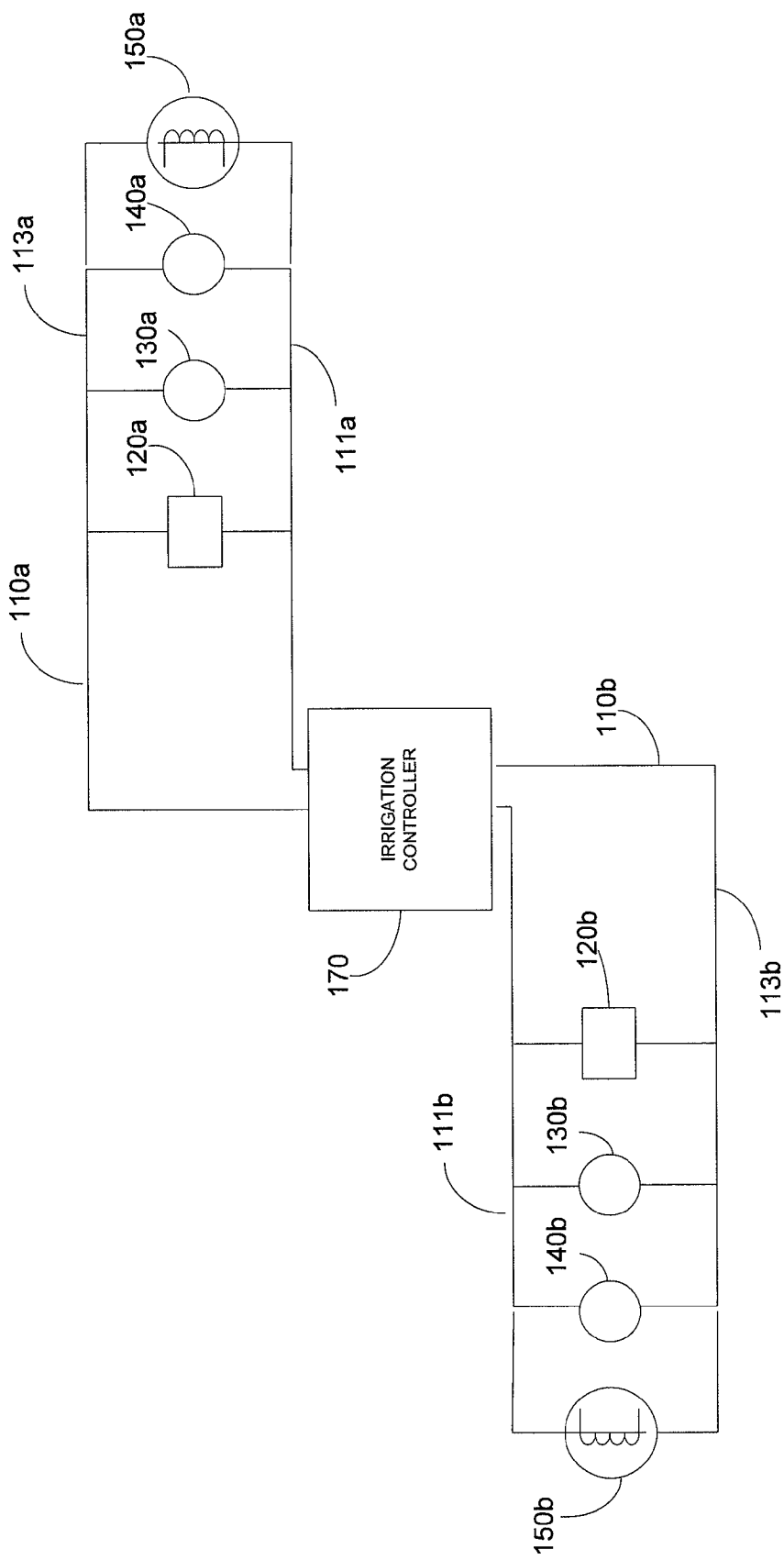
FIG. 1 is a circuit diagram for a system for controlling irrigation.

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in irrigation controllers and irrigation sensors that communicate over a communication circuit. More particularly, it is contemplated that the embodiments may be implemented in or associated with irrigation systems that include valve actuators that include a solenoid for actually opening and closing an irrigation valve. Because the sensor control signals, data signals and valve control signals are communicated on the same circuits, such devices are configured to be addressed with signals of different duration or with other communication protocol. For example, the solenoid may be actuated via one or more actuation signals (or pulses) that are longer than a solenoid actuation time threshold, and such signal can be longer in duration than signals communicated to sensors. The implementations described herein refer to valve actuators that include a solenoid for actuating (opening or closing) an irrigation valve. Accordingly, the valve actuators are sometimes simply referred to as a "solenoid" and the valve controls signals can be referred to as "solenoid control signals" or solenoid actuation signals" or the like. A person having ordinary skill in the art will appreciate that other types of valve actuators, and corresponding control signals, are also contemplated.

As described above, smart irrigation control systems may receive input from one or more sensors. The input received from these sensors may be used by the irrigation controller to adapt or modify the parameters of an irrigation program.

Some irrigation systems include a wired circuit between an irrigation controller and a valve actuator. These wired circuits may consist of two wires, each connected to the irrigation controller and the valve actuator. The valve actuator may include a water valve and a solenoid that controls the water valve. In some systems, wired circuits between irrigation sensors and the irrigation controller may be in addition to the wired circuit between the solenoid and irrigation controller. In other words, some systems do not share wiring circuits between irrigation sensors and value actuators.

One method to reduce the cost and logistical challenges of installing a smart irrigation control system is to share the wired connection between the solenoid/water valve and the irrigation controller with one or more irrigation sensors. When upgrading legacy systems, the ability to use existing wiring for new sensors can eliminate the need to run new wiring, and greatly reduce the logistical and financial barriers to installation of a smart irrigation system. In some systems, a two wire circuit may be shared by an irrigation controller, a valve actuator that may include a solenoid, and one or more irrigation sensors.

To practically share the solenoid actuation wiring circuit with one or more irrigation sensors, the control and data signals used to implement the irrigation sensor data collection should not interfere with the solenoid actuation signals. Similarly, actuation and deactuation of the solenoid should also not interfere with the sensor data collection.

In some implementations, interference between the actuation or deactuation of a solenoid and data collection from irrigation sensors may be avoided by ensuring the transfer of irrigation sensor data from a sensor to an irrigation controller utilize electrical pulses that are shorter than a solenoid actuation time threshold. Some solenoids may be actuated by pulses of relatively low amplitude to enable the transmission of the actuation pulses over long distances. Because the actuation pulses are lower amplitude, they may be of a longer duration to ensure they provide sufficient electrical energy to actuate the solenoid. The solenoid may then utilize a pulse compression and polarity circuit to raise the voltage level sufficiently to actuate the solenoid.

Because the solenoid actuation pulses may be of a duration longer than a solenoid actuation time threshold, pulses of a duration shorter than the threshold may not be passed through to the solenoid by the solenoid actuation circuitry. For example, some implementations include circuitry that does not trigger the solenoid unless the pulse is longer than 15 milliseconds. Other implementations may provide other solenoid actuation time thresholds. For example, some implementations may include circuitry that does not trigger the solenoid unless the pulse is longer than 5, 10, 20, 50, 75, or 100 milliseconds (ms).

In irrigation controller and solenoid implementations that utilize these longer solenoid actuation pulses, pulses of a duration shorter than the solenoid actuation time threshold may be present on the solenoid actuation circuit without interfering with the solenoid. These pulses may then be used to control and collect data from irrigation sensors sharing the wiring circuit between the irrigation controller and the solenoid.

Pulses shorter than a solenoid actuation time threshold can be structured to define a communication protocol that facilitates data transfer between the irrigation controller and the irrigation sensors. The communication circuit that connects the irrigation controller to the valve actuator and solenoid can then be used as a communication network to facilitate data transfer between the irrigation controller and irrigation sensors attached to the communication circuit. This communication protocol may be segmented into several functions. The communication protocol disclosed below may be organized into a charging function, addressing function, and data transfer function.

The Charging Function

In some implementations, irrigation sensors may include their own power source. For example, some irrigation sensors may include a battery or solar array and capacitors to provide the power necessary to collect irrigation data and generate it on a communication circuit. These power sources may provide power for electronic circuits included in an irrigation sensor. Such circuits may be coupled to a communication circuit and be configured to "listen" for or detect a signal that indicates the sensor's device identifier or address. That is, the circuit can receive signals on the communication circuit and determine when a signal indicates a particular sensor by the sensor's device indicator or address. The particular sensor indicated by the signal can then perform one or more actions when such a signal is received. Such power sources may also provide power enable the sensor to transmit data (for example, sensed data) over the communication circuit.

In other implementations, an irrigation sensor may include no power source of its own. In these implementations, the irrigation sensor may obtain power via one or more charging pulses sent by the irrigation controller over the communication circuit. These charging pulses may be between one millisecond and 100 milliseconds in length. In some implementations, a solenoid actuation time threshold is 15 milliseconds. In these implementations, the charging pulses may be less than 15 milliseconds in length. In some implementations, the charging pulse may be between 9 milliseconds and 11 milliseconds in length.

Some irrigation sensors may include capacitors that are electrically connected to the communication circuit. The irrigation controller may be configured to send one or more charging pulses on the communication circuit. The electrical energy provided by these pulses may be captured and stored by one or more capacitors in the irrigation sensor. The power stored in the one or more capacitors may then be used to power circuits within the irrigation sensor that listen for the sensor's address on the communication circuit. The power provided by the capacitors may also be used in some implementations to power irrigation sensor circuits that generate sensor data on the communication circuit.

The Addressing Function

Because more than one sensor may share the wiring circuit with a solenoid, there may be a need for each sensor to be individually addressable on the circuit. To accomplish this, each sensor may have a unique address or device identifier. In some implementations, the address or device identifier of each sensor may be hardwired when the sensor is manufactured. For example, moisture sensors may be hardwired with a particular first address or device identifier while all rain sensors may be hardwired with a particular second address. If each sensor type is hardwired with a particular address, it may not be possible to include more than one of each sensor type on a particular communication circuit.

Some other implementations may allow the address of each sensor to be configured after it is manufactured. For example, some sensors may include dip switches or other methods to manually or electronically configure a static address for the sensor. During installation and configuration of a communication circuit, an irrigation technician may be responsible for ensuring each sensor on the circuit has a unique address via appropriate configuration of the sensors.

Some other implementations may provide a sensor discovery protocol on the communication circuit. In these implementations, the irrigation controller may transmit one or more address discovery messages on the communication circuit. In response, each sensor may transmit one or more messages to the controller. Randomization of response delays by the sensors may reduce data "collisions" and contention for addresses by sensors. Collision detection or token passing may also be implemented. In some of these implementations, each sensor may choose its own address, and select another address when a collision with another sensor is detected. These sensors may then broadcast their address on the communication circuit.

Once the communication circuit has been configured such that each irrigation sensor has been assigned a unique address, the irrigation controller may address a sensor by encoding the sensor's address on the communication circuit via a series of addressing pulses. These addressing pulses may have a duration of less than one millisecond in some implementations. The addressing pulses may also have a duration longer than one millisecond, but in some implementations the addressing pulses will be shorter than a solenoid actuation time threshold to prevent the addressing pulses from actuating a solenoid. When a sensor's address is encoded on the communication circuit, the sensor with an address matching the encoded address may generate its sensor data in response on the communication circuit.

For example, in some implementations an irrigation controller may first address a moisture sensor by encoding its address on a communication circuit. In response, the moisture sensor may then transmit its moisture data on the communication circuit. The irrigation controller may then address a rain sensor by encoding its unique address on the communication circuit. In response, the rain sensor may transmit its data over the communication circuit. In some implementations, the irrigation controller may generate one or more charging pulses as described above between reading data from the moisture sensor and addressing the rain sensor. This one or more additional charging pulses may ensure the rain sensor has an adequate charge after the moisture sensor has completed sending its data.

The Data Transfer Function

After an irrigation sensor detects its encoded address on the communication circuit, the sensor may generate data on the circuit in response. This data may encode, in analog or digital form, data collected by the sensor. For example, if the sensor is a moisture sensor, the data may encode a moisture measurement. If the sensor is a rain sensor, the data may encode a rain measurement. If the sensor is a flow sensor, the data may encode an amount of water flow, for example, in cubic feet per minute. More details on how the data may be encoded is provided below.

After the irrigation controller receives data from one or more sensors, the irrigation controller may execute a control action based at least in part on the received data. For example, if a moisture sensor provides data to the irrigation controller indicating that the soil in a particular irrigation control has a high moisture content, an irrigation controller may determine that no additional irrigation of that zone should be performed. Similarly, if the moisture sensor provides data indicating that the soil moisture content is low, a smart irrigation controller may extend the amount of irrigation provided to the sensor's irrigation zone. The irrigation controller may execute other control actions in response to receiving sensor data over a shared wired connection. For example, the irrigation controller may raise an alarm signal, actuate a solenoid, deactuate a solenoid, delay actuation of a solenoid, or adjust an irrigation time.

FIG. 1 is a block diagram of an irrigation system implementing at least one of the disclosed embodiments. FIG. 1 shows an irrigation controller 170 configured to control two communication circuits, 110a and 110b. While two communication circuits are shown, some implementations of irrigation controller 170 may control up to 100 or more separate communication circuits. Communication circuit 110a is shown including a valve actuator and solenoid 150a. Valve actuator and solenoid 150a may actuate a water valve that provides irrigation to a particular irrigation zone covered by communication circuit 110a. Valve actuator and solenoid 150a may be actuated by irrigation controller 170 generating one or more solenoid actuation pulses over communication circuit 110a. These solenoid actuation pulses may be longer than a solenoid actuation time threshold. These pulses may also be bi-polar pulses.

Communication circuit 110a also includes three irrigation sensors, 120a, 130a and 140a. These irrigation sensors may include a rain sensor, a flow sensor, and a moisture sensor. Other sensor types are also contemplated. Note that each of irrigation sensors 120a, 130a, and 140a, along with valve actuator and solenoid 150a are wired in parallel within communication circuit 110. By wiring each component in parallel, the removal or failure of one component does not disrupt the function of other components on communication circuit 110a.

The communication circuits 110a and 110b each may consist of two conductive circuits 111 and 113 (each of which may referred to herein as an "electrical connector"). In other words, the communication circuit 110a can consist of a first electrical connector 111a and a second electrical connector 113a. Communication circuit 110b can consist of a first electrical connector 111b and a second electrical connector 113b. Each conductive circuit (electrical connector) 111 and 113 can be a single wire, for example, for communication circuit 110a conductive circuit 111a is a single wire and conductive circuit 113a is a single wire. Such implementations can reduce the cost of wiring materials and facilitate easy addition of sensors to an existing irrigation circuit that uses two wires to send signals to a valve actuator. As illustrated in FIG. 1, each of the conductive circuits 110a and 110b may be connected to the irrigation controller 170, and the irrigation sensors 120a or 120b, 130a or 130b, and 140a or 140b, respectively. The conductive circuits 110a and 110b may also be connected to the valve actuators and solenoids 150a or 150b, respectively. In some implementations, the irrigation controller communicates with each set of irrigation sensors and actuators/solenoids using only two conductive circuits of a corresponding communication circuit. For example, irrigation controller 170 may communicate with irrigation sensors 120a, 130a, and 140a, and solenoid 150a, using only the two conductive circuits 111a and 113a (e.g., wires) of communication circuit 110a.

Irrigation controller 170 may collect irrigation data from irrigation sensors 120a, 130a, and 140a. When the irrigation controller receives the irrigation data, it may perform one or more control actions based on the data. For example, the irrigation controller may receive data from a moisture sensor. If the moisture sensor indicates that the ground is sufficiently moist, the irrigation controller may not actuate the solenoid to irrigate the particular zone. Similarly, if data received from a rain gauge sensor indicates a recent amount of rain sufficient to provide the necessary moisture for landscaping, the controller may also not actuate the solenoid.

Irrigation controller 170 may collect this irrigation data without interfering with valve actuator and solenoid 150a by use of a communication protocol that utilizes pulse widths that are shorter than the solenoid actuation time threshold discussed above. For example, irrigation controller 170 may generate one or more charging pulses on communication circuit 110 or communication circuit 110b to charge the irrigation sensor devices on the circuit. Irrigation controller 170 may then generate one or more addressing pulses over the communication circuit 110a or 110b. These addressing pulses may be received by an irrigation sensor on the communication circuit 110a or 110b. The receiving irrigation sensor may then determine whether the pulses encode an address or device identifier that matches the device identifier of the irrigation sensor. If the device identifier encoded by the pulses does match the sensor's address, the sensor is configured to generate data encoding measurements of the sensor.

Figure 2:
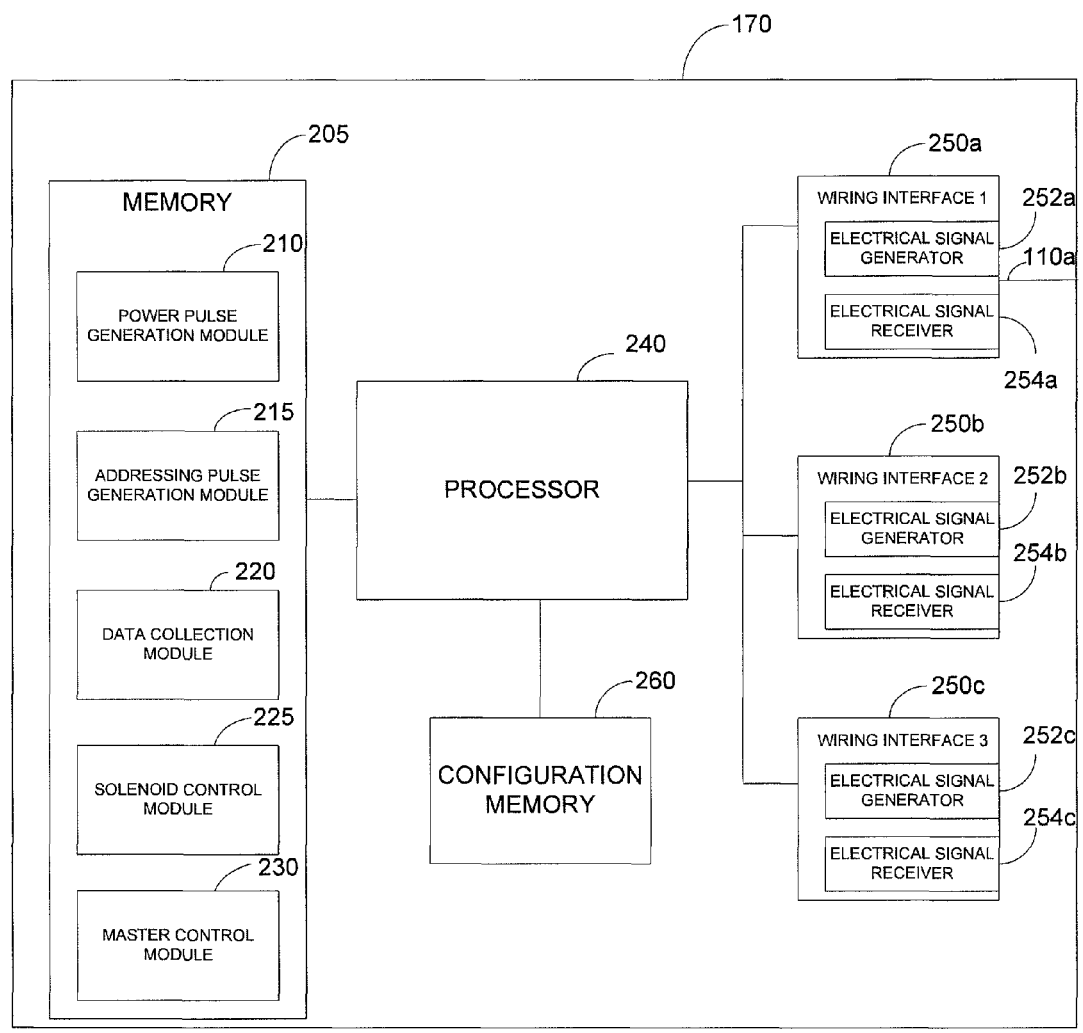
FIG. 2 is a block diagram of one implementation of an irrigation controller.

FIG. 2 is a block diagram of one implementation of an irrigation controller. Irrigation controller 170 includes a processor 240, operably connected to a memory 205, a configuration memory 260, and three wiring interfaces 250a-c. Each wiring interface includes an electrical signal generator 252a-c, and an electrical signal receiver 254a-c. Memory 205 includes several modules that store instructions that configure processor 240 to perform functions of irrigation controller 170. Configuration memory 260 includes configuration data to support operations of irrigation controller 170. For example, configuration memory 260 may store the addresses of irrigation sensors on a communication circuit, such as communication circuit 110a.

Each of the three wiring interfaces 250a-c may connect to a communication circuit, such as for example the communication circuits 110a-b illustrated in FIG. 1. For example, wiring interface 250a is shown connected to communication circuit 110a. Via wiring interfaces 250a-c, irrigation control module 170 may perform one or more functions on the communication circuit. For example, irrigation control module 170 may generate one or more charging pulses over a communication circuit connected to one of the wiring interfaces 250a-c. To generate the charging pulses, instructions stored in a power pulse generation module 210 may configure processor 240 to generate pulses over one of wiring interfaces 250a-c using one of electrical signal generators 252a-c.

Irrigation controller 170 may also generate one or more addressing pulses over one or more communication circuits using one or more of wiring interfaces 250a-c. To generate the addressing pulses, instructions stored in the addressing pulse generation module 215 may configure processor 240 to generate pulses using one or more wiring interfaces 250a-c. In some implementations, the number of addressing pulses generated by irrigation controller 170 to encode an address or device identifier is between one and ten pulses.

Irrigation controller 170 may also read data over one or more communication circuits connected to the irrigation controller 170 via one or more of wiring interfaces 250a-c. Instructions stored in the data collection module 220 may configure processor 240 to read data on one or more of the wiring interfaces 250a-c using electrical signal receivers 254a-c.

Irrigation controller 170 may also actuate and deactuate one or more solenoids that control one or more water valves via wiring interfaces 250a-c. In some implementations, irrigation controller 170 may generate one or more bi-polar pulses over a communication circuit. Instructions stored in the solenoid control module 225 may configure processor 240 to generate the bi-polar pulses using one or more of wiring interfaces 250a-c.

Irrigation controller 170 also includes a master control module 230. The master control module 230 stores instructions that configure processor 240 to coordinate the overall operations of irrigation controller 170. For example, instructions in the master control module 230 may coordinate the sequencing of operations on a communication circuit. For example, the master control module 230 may, in some implementations, invoke subroutines in the power pulse generating module 210 to configure processor 240 to generate one or more charging pulses. The charging pulses may be generated via one of wiring interfaces 250a-c using one or more electrical signal generators 252a-c.

The master control module 230 may then invoke subroutines in the addressing pulse generation module 215 to generate one or more addressing pulses on a communication circuit. These addressing pulses may configure an irrigation sensor on the communication circuit to generate data on the circuit. Instructions in the master control module 230 may then invoke subroutines in the data collection module 220 to read data from the communication circuit.

Figure 3:
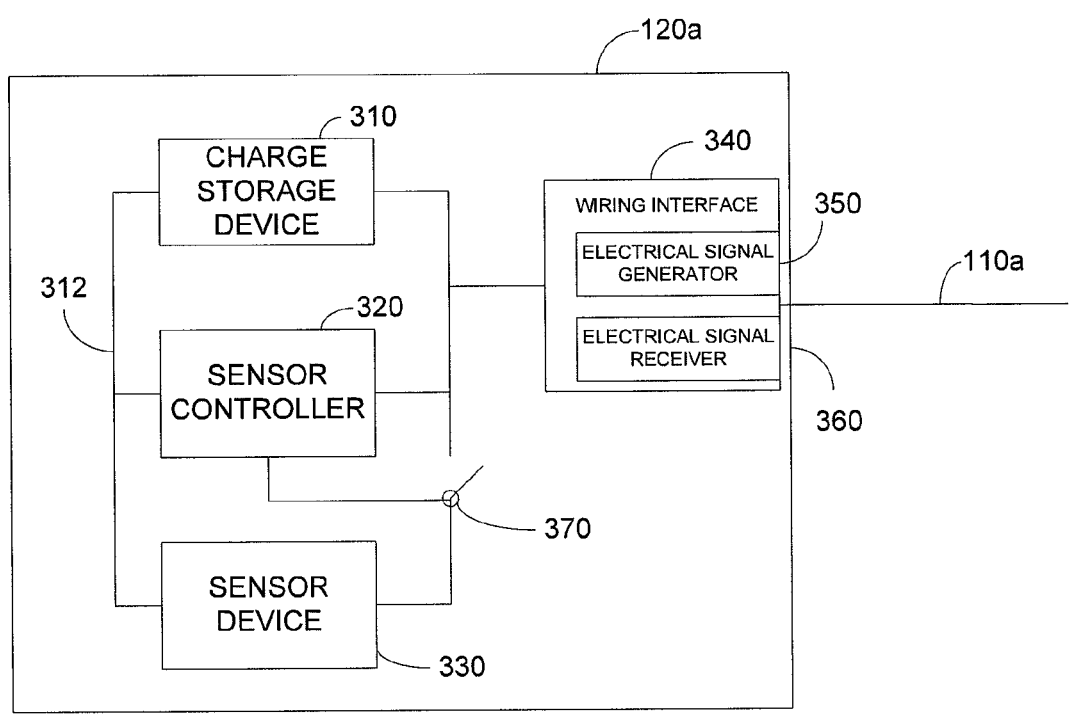
FIG. 3 is a block diagram of one implementation of an irrigation sensor.

FIG. 3 is a block diagram of one implementation of an irrigation sensor. In various implementations, irrigation sensor 120a may be, but is not limited to, a moisture sensor, flow sensor, rain sensor, temperature sensor, humidity sensor, radiation sensor, or wind sensor. Other sensor types are also contemplated. Irrigation sensor 120a includes a wiring interface 340. The wiring interface 340 includes an electrical signal generator 350 and an electrical signal receiver 360. The wiring interface 340 connects irrigation sensor 120a to a communication circuit 110a. Electrically connected to the wiring interface 340 is a charge storage device 310, sensor controller 320 and sensor device 330. The charge storage device 310 may in some implementations include one or more capacitors that receive electrical energy from the communication circuit 110a connected to the wiring interface 340. For example, an irrigation controller such as the irrigation controller 170 disclosed in FIG. 2, may generate one or more charging pulses on the communication circuit 110a. These charging pulses may be received by the wiring interface 340 included as part of irrigation sensor 120a. The electrical energy in these pulses may then be transferred to the charge storage device 310 via the wiring interface 340.

After the charge storage device 310 has stored electrical energy from the charging pulses, the electrical energy may be supplied to the sensor controller 320 and the sensor device 330 via power supply line 312.

Still referring to FIG. 3, the sensor controller component 320 may receive electrical pulses over the communication circuit 110a via wiring interface 340 and electrical signal receiver 360. The sensor controller component 320 is configured to decode addressing pulses received over the communication circuit 110a. The sensor controller component 320 is also configured to determine whether the addressing pulses (or signals) that are detected on the communication circuit 110a decode to an address or device identifier of the irrigation sensor 120a. If the series of addressing pulses do decode to an address of the irrigation sensor 120a, sensor controller component 320 will close a switch 370. When switch 370 is closed, the sensor device 330 generates data which may be provided on the communication circuit 110 via the wiring interface 340 and the electrical signal generator 350, using electrical energy provided by the power supply line 312.

Sensor device 330 of FIG. 3 may be a moisture sensor, rain sensor, flow meter, or any other irrigation sensor device. When sensor device 330 is powered via power supply line 312 and connected to the communication circuit via switch 370 and wiring interface 340, sensor device 330 generates either an analog signal or a digital signal encoding irrigation data that can be provided to the communication circuit 110a such that the signal or data may be received by an irrigation controller (for example, irrigation controller 170 illustrated in FIG. 2).

Still referring to FIG. 3, as a person having ordinary skill in the art will appreciate, a particular sensor may provide analog data or digital data. For example, if irrigation sensor 120a is a flow meter, sensor device 330 may generate a digitally encoded value that represents a water flow rate. Alternatively, sensor device 330 may generate an analog signal with a voltage corresponding to a flow rate. In still other embodiments, sensor device 330 may generate pulses corresponding to the rotation of a water wheel. When these pulses are received by an irrigation controller (e.g., irrigation controller 170, FIG. 2), the irrigation controller may determine a flow rate based on a speed of rotation derived from the pulses, and other known characteristics of sensor 120a.

If irrigation sensor 120a is a moisture sensor, sensor device 330 may generate either an analog signal or a digital signal encoding a moisture measurement. If irrigation sensor 120a is a rain sensor, sensor device 330 may generate an analog or digital signal encoding an indication of rain. For example, a bucket tip count may be encoded if irrigation sensor 120a is a tipping bucket rain sensor.

In some implementations, sensor device 330 will continue to generate data and encode its sensor measurement until power received via power supply line 312 decreases. This may occur when electrical energy stored in charge storage device 310 falls below an threshold (for example, an operational power threshold for the sensor device 330).

Figure 4A:
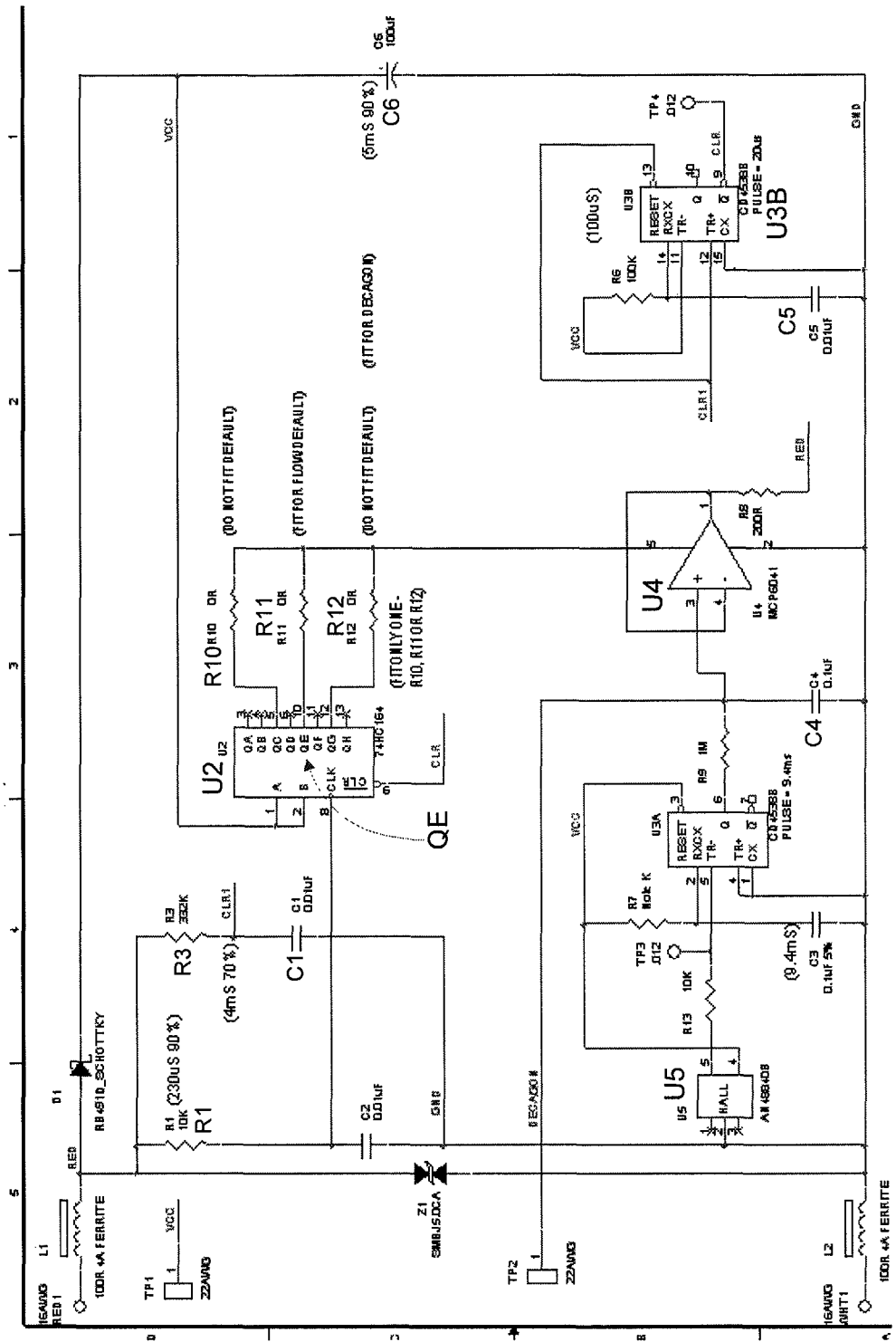
FIG. 4A is a example of a circuit diagram of an irrigation sensor, according to one implementation.

FIG. 4 is a circuit diagram of one implementation of an irrigation sensor. A person having ordinary skill in the art will understand that other circuit configurations can be contemplated to perform the same functionality, and that the invention is not limited by this particular embodiment. The irrigation sensor illustrated in FIG. 4 is a flow sensor. Capacitor C6 may receive electrical energy provided by one or more charging pulses from an irrigation controller. Energy provided by capacitor C6 may provide enough power for the circuit shown in FIG. 4 to operate for several seconds. Circuit U5 is a hall effect sensor operable to detect a magnetic field. The illustrated irrigation sensor also includes a paddle wheel (not shown) which includes four magnets positioned on vanes of the paddle wheel. The magnets are arranged on the paddle wheel so as to provide detectable alternating magnetic polarity as the paddle wheel rotates. When the wheel rotates, the alternating magnetic polarity will switch the field output of circuit U5. In some implementations, one revolution of the paddle wheel can cause circuit U5 to generate two square waves. These square waves are generated as a result of two pairs of alternating polarity magnets passing near circuit U5 as the paddle wheel rotates. The pulses generated by circuit U5 may charge capacitor C4.

A charging pulse received by capacitor C5, resistor R3, capacitor C1, and circuit U3B generate a short pulse which resets the shift register U2. When an irrigation controller sends a series of addressing pulses on a communication circuit, shift register U2 receives these pulses and processes them as clock pulses. These pulses configure shift register U2. If the received pulses correspond to the address of the irrigation sensor, a combination of resistors R10, R11, and R12, and the output QE of shift register U2 power up operational amplifier U4. In the illustrated embodiment, op-amp U4 passes voltage provided by capacitor C4 to the communication circuit. With such a circuit design, a voltage proportional to the flow of the water can then generated on the communication circuit.

Figure 4B:
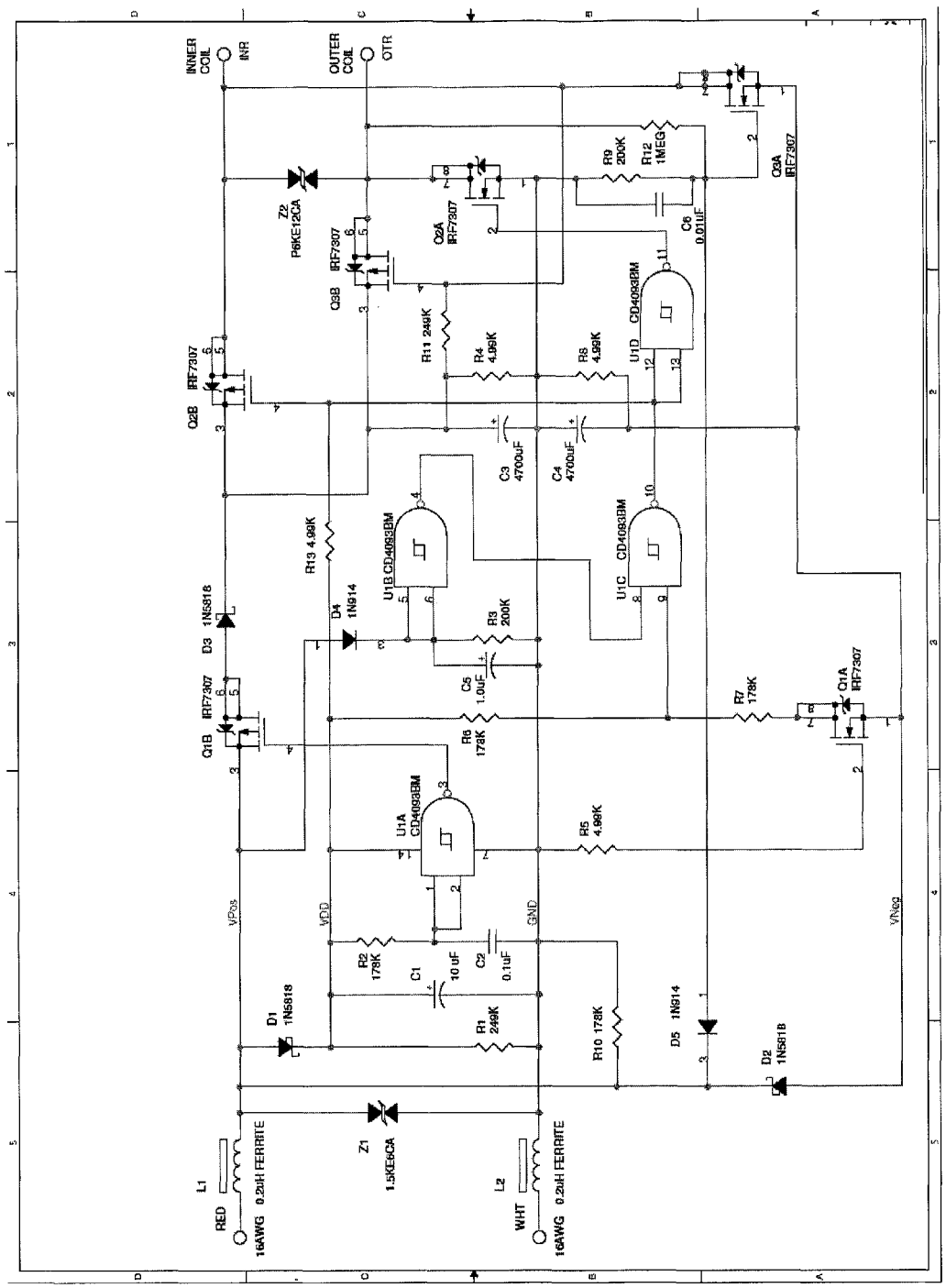
FIG. 4B is a example of a circuit diagram of an solenoid actuation circuit, according to one implementation.

FIG. 4B is a example of a circuit diagram of an solenoid actuation circuit, according to one implementation. A person having ordinary skill in the art will understand that other circuit configurations can be contemplated to perform the same functionality, and that the invention is not limited by this particular embodiment. On the left hand side of the schematic the inputs "RED" and "WHT" refer to a first and a second wire forming an electrical connection between the irrigation controller and the solenoid actuation circuit. The output of the solenoid actuation circuit is illustrated on the right hand side of the schematic as "INR" and "OTR" which refer to the inner and outer coils of the solenoid.

There are two operations, open and close, and both function differently. It takes greater energy to open the solenoid than to close it. To address this need for greater energy, the solenoid actuation circuit is operable as a voltage doubler for opening the solenoid. Since in this implementation the applied voltage is about 4.5V after wire losses, the solenoid pulse to open will be approximately 9V and 4.5V to close the solenoid.

OPEN Pulse

The voltage provided by the source (e.g., the irrigation controller) to open the solenoid can be a positive 5V pulse on the RED input connection (with respect to the WHT input connection) for 650 millisecond (ms) followed immediately by 420 ms positive 5V pulse on the WHT input connection (with respect to the RED input connection). The pulse is applied via Schottky diode D1 to charge up capacitor C1, which will hold power for circuit U1A (e.g., a NAND gate) for the duration of the "ON" pulses. Initially capacitor C2 is discharged holding circuit UTA input low. Circuit U1A output is high holding transistor Q1B (e.g., a MOSFET transistor) off which blocks power to Schottky diode D3. Capacitor C2 charges through resistor R2 and at approximately 15 ms the voltage on C2 reaches the Schmitt threshold of circuit U1A which turns on, turning switch Q1B on which applies power to Schottky diode D3.

From the start before circuit U1A switches on, circuit U1B (e.g., a NAND gate) switches output low via diode D4 input and circuit U1B output holds circuit U1C (e.g., a NAND gate) output high which holds transistor Q2B off blocking power from being provided to the coil connection at INR. Also transistor Q2A is held off by circuit U1D. Capacitor C3 now starts to charge up and the rising voltage holds transistor Q3B off. The time taken by capacitor C3 to charge up is determined by the source resistance plus the wire connecting the controller to the solenoid. For example, a resistance of 30 Ohms for 14 AWG irrigation wire is more than 5000 feet of wire in both legs. In the implementation illustrated in FIG. 4B, The time constant with 30 ohms is 30×4700 uF=141 mS, so with a 650 ms pulse the voltage reaches 99%. At the end of the 650 ms pulse capacitor C3 is charged. The polarity is now reversed, switch Q1A turns on and circuit U1C is maintained at an output of "high." The negative polarity is blocked by diode D1 and passed by Schottky diode D2 to charge up capacitor C4 in the negative direction. The negative polarity also keeps transistor Q3A off via diode D5. At the end of the negative pulse C4 is charged negatively. The gate of transistor Q3A rises and starts to turn on, which turns on transistor Q3B and positive feedback via resistor R12 causes transistors Q3A and Q3B to switch on passing the positive charge of capacitor C3 to the outer coil winding at OTR, and the negative charge of capacitor C4 to the inner coil winding at INR. Therefore, in this implementation a total of approx. 9V can be provided to the coil to open the solenoid (i.e., turn on the water valve).

CLOSE Pulse

The first ON pulse turns transistor Q2B off via circuits U1B and U1C, and also turns transistor Q2A off via circuit U1D. When the first positive OPEN pulse concludes, the reverse polarity pulse holds circuit U1C output high (via transistor Q1A input). Therefore, transistors Q2A and Q2B remain off during the negative pulse. At the end of the negative pulse the OPEN pulse is generated as described above and all energy is dissipated. A CLOSE pulse is similar to the initial OPEN pulse but circuit U1C is not held output high (via transistor Q1A) by the negative pulse. With no negative pulse, circuit U1B is held with output low by the charge on capacitor C5 when the positive pulse concludes. At a time set by capacitor C5, resistor R3 and the Schmitt level circuit U1B output goes high, circuit U1C output goes low. Transistor Q2B turns on and transistor Q2A turns on via circuit U1D switching the positive charge on capacitor C3 to the inner winding connection INR (via transistor Q2B) and the negative charge of capacitor C3 to the outer winding connection OTR via transistor Q2A.

Figure 5A:
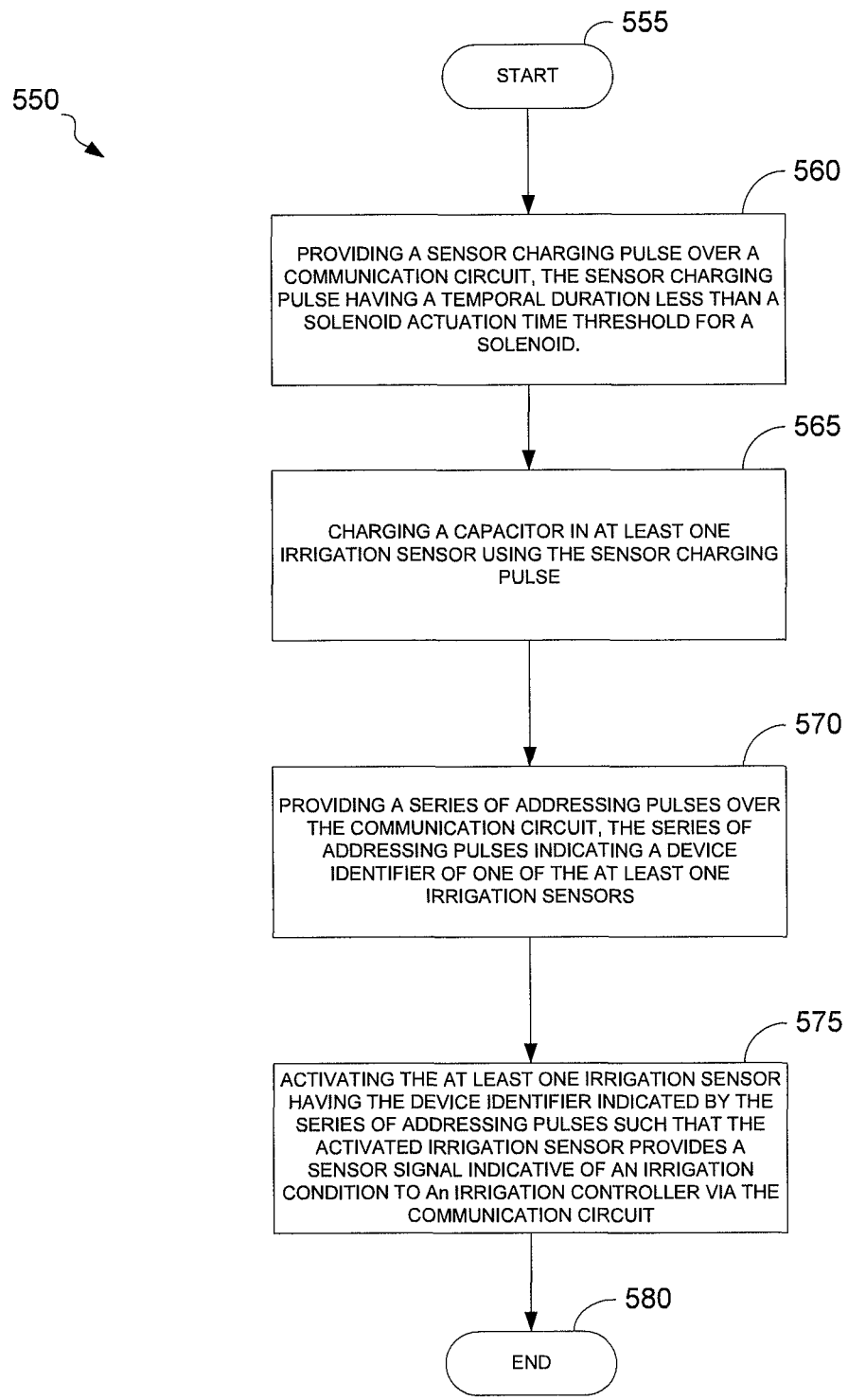
FIG. 5A is a flowchart of one implementation of a method of controlling an irrigation system.

FIG. 5A is a flowchart of one implementation of a method of controlling an irrigation system. Portions of process 550 may be implemented by instructions included in one or more of the power pulse generation module 210, addressing pulse generation module 515, data collection module 220, and solenoid control module 225, illustrated in FIG. 2. Some other portions of process 550 may be implemented by an irrigation sensor, for example, irrigation sensors 120a-b, 130a-b, or 140a-b, illustrated in FIG. 1 and FIG. 3. Process 550 begins at start block 555 and then moves to block 560, where a sensor charging pulse is provided over a communication circuit.

The sensor charging pulse has a temporal duration less than a solenoid actuation time threshold for a solenoid. The actuation of the solenoid in some implementations may include charging one or more capacitors. These capacitors may be charged by electrical pulses of sufficient duration to charge the capacitors to an activation energy level sufficient to actuate the solenoid. The total duration of pulses on the communication circuit that will charge the capacitors to the activation energy level may be a solenoid actuation time threshold in some implementations.

After the sensor charging pulse is provided, process 550 moves to block 565, where a capacitor in at least one irrigation sensor is charged using the sensor charging pulse. Similar to the solenoid design described above, one or more irrigation sensors may include capacitors configured to accept electrical energy from the communication circuit. When a sensor charging pulse is provided in block 560, these one or more capacitors may accumulate energy that may be used to power the irrigation sensor for later operations. After the one or more capacitors are charged in block 565, process 550 moves to block 570.

In block 570, a series of addressing pulses is provided over the communication circuit. The series of addressing pulses indicate a device identifier of one of the at least one irrigation sensors. The series of addressing pulses provided in block 570 may also have a combined duration less than the solenoid actuation time threshold for a solenoid. In some implementations, the combined duration of the charging pulse provided in block 560 and the addressing pulses provided in block 570 may also be less than the solenoid actuation time threshold. After the addressing pulses are generated in block 570, process 550 moves to block 575.

In block 575, the at least one irrigation sensor having the device identifier indicated by the series of addressing pulses is activated. An activated irrigation sensor provides a sensor signal indicative of an irrigation condition to an irrigation controller via the communication circuit. In some implementations the signal provided by the activated irrigation sensor may be a digital signal that digitally encodes irrigation data. For example, the digital data may encode a water flow rate for a flow sensor, or moisture reading for a moisture sensor.

In some other implementations, the signal provided by the irrigation sensor may be an analog signal, with voltage levels of the signal corresponding to, for example, a moisture measurement when generated by an irrigation moisture sensor. The voltage level of the analog signal may correspond to a flow rate when generated by an irrigation moisture sensor. Alternatively, some flow rate sensor implementations may generate electrical pulses on the communication circuit corresponding to the rotation of a paddle wheel.

In some implementations, the electrical energy generated by the irrigation sensor in block 575 may be less than the energy required to activate the solenoid described above. In some implementations, the combined electrical energy generated by the charging pulse in block 560, the addressing pulses in block 570, and the sensor signal generated in block 575 may be less than the energy needed to activate the solenoid. After the sensor signal is generated in block 575, process 550 moves to end block 580 and process 550 terminates.

Figure 5B:
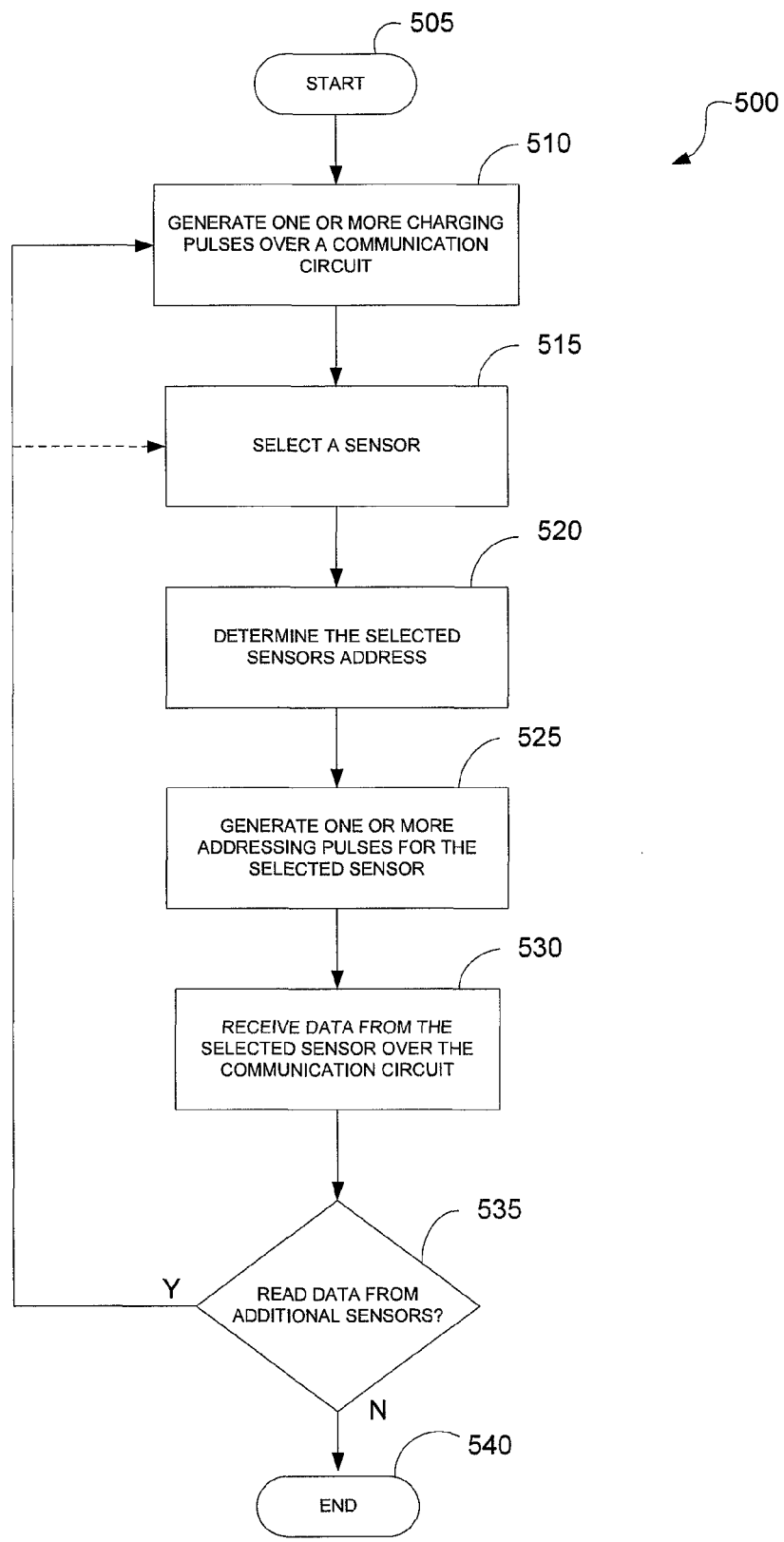
FIG. 5B is a flowchart of one implementation of a method for collecting irrigation data from an irrigation sensor over a communication circuit.

FIG. 5B is a flowchart of a process for communicating data with one or more irrigation sensors over a communication circuit. Process 500 may be implemented by instructions included in one or more of the power pulse generation module 210, addressing pulse generation module 515, data collection module 220, and solenoid control module 225, illustrated in FIG. 2. Process 500 begins at start block 505 and then moves to block 510, where one or more charging pulses is generated over a communication circuit. Each charging pulse may have a temporal duration shorter than a solenoid actuation time threshold. In some other implementations, the combined temporal duration of all of the charging pulses may also be less than a solenoid actuation time threshold. The communication circuit may connect one or more irrigation sensors and a solenoid in parallel. For example, the communication circuit may be similar to the communication circuit 110a or 110b illustrated in FIG. 1.

Process 500 then moves to processing block 515 where a sensor is selected. For example, process 500 may select one of the sensor connected to the communication circuit. Process 500 then moves to processing block 520 where it determines the address of the selected sensor. The address of the selected sensor may be stored in a memory. For example, the address may be stored in a configuration memory such as configuration memory 260 illustrated in FIG. 2.

Process 500 then moves to processing block 525, where one or more addressing pulses are generated for the selected sensor. The addressing pulses generated in block 525 may encode the address of the selected sensor determined in block 520. Process 500 then moves to block 530, where data is received from the selected sensor over the communication circuit. After data from the sensor has been read, process 500 moves to decision block 535 where it is determined whether data from any additional sensors will be read. If data will be read from additional sensors, process 500 returns to block 510 and one or more charging pulses is generated, and process 500 repeats. Note that in some implementations of process 500, process 500 may move from decision block 535 to processing block 515, bypassing block 510. In these implementations, the energy storage capacity of the sensors may permit multiple addressing and read operations (as described by processing blocks 515, 520, 525, and 530, without recharging the irrigation sensors. These implementations are illustrated in FIG. 5B by the dotted arrow returning to processing block 515.

In the implementations of process 500, the combined electrical energy generated on the communication circuit in blocks 510 and 525 may be less than the energy necessary to activate the solenoid. Furthermore, the combined temporal duration of the charging pulses generated in block 510, addressing pulses generated in block 525, and data received from the sensor (in block 530) may also be less than the solenoid actuation threshold.

If no more data is to be read from any additional sensors in decision block 535, process 500 moves to end block 540 and process 500 terminates.

Figure 6:
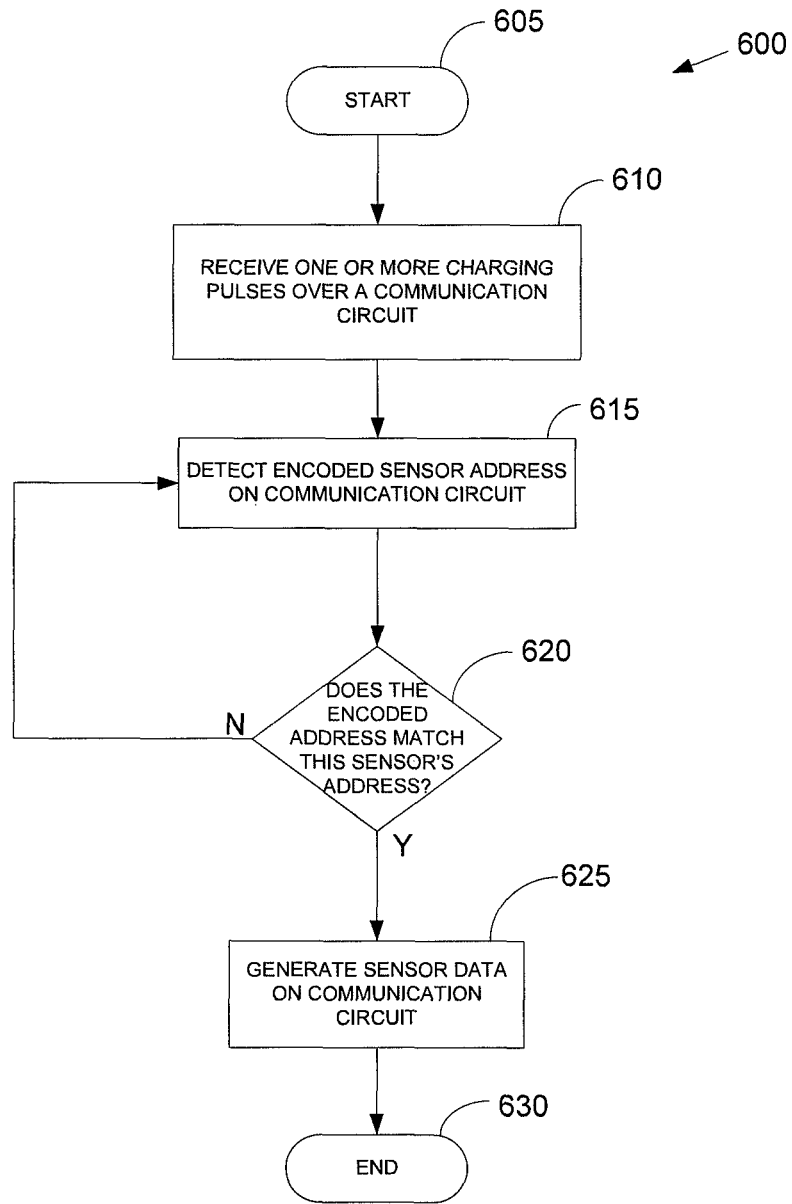
FIG. 6 is a flowchart of one implementation of a method for generating sensor data on a communication circuit.

FIG. 6 is a flowchart of a process for generating data over a communication circuit. Process 600 may be implemented by an irrigation sensor, for example, irrigation sensors 120a-b, 130a-b, or 140a-b, illustrated in FIG. 1 and FIG. 3. Process 600 begins at start block 605 and then moves to processing block 610 where one or more charging pulses are received over the communication circuit. Process 600 then moves to processing block 615, where the sensor running process 600 listens for an encoded sensor address on the communication circuit. Upon detecting an encoded sensor address, process 600 moves to decision block 620, where it is determined whether the detected encoded sensor address matches the address of the sensor running process 600, also known as the local address or a device identifier. If the addresses do not match, process 600 returns to processing block 615 and continues to listen for more encoded addresses on the communication circuit. If the detected address does match the local address, process 600 moves to processing block 625, where the sensor running process 600 generates sensor data on the communication circuit. Process 600 then moves to end block 630 and process 600 terminates.

Figure 7A:
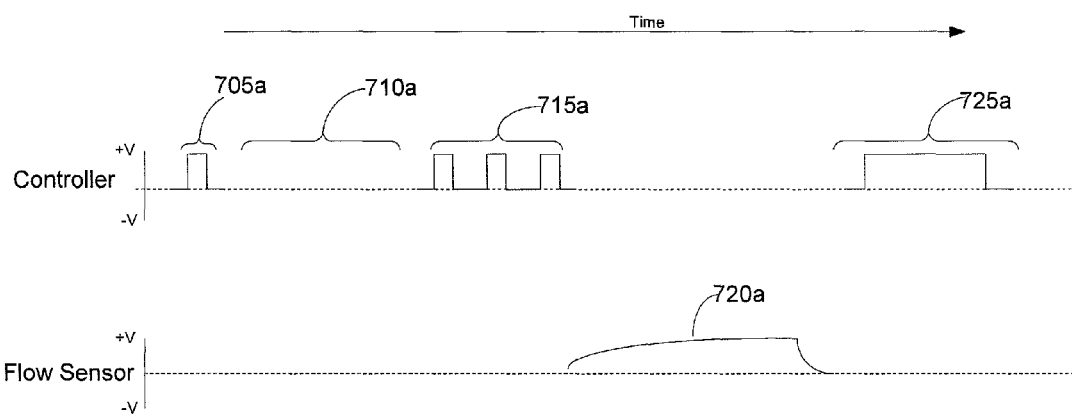
FIG. 7A-D are sequence diagrams illustrating examples of electrical pulses sent by over a communication circuit that includes including an irrigation controller, at least one irrigation sensor, and a valve actuator having a solenoid coupled to an irrigation valve.

FIGS. 7A-D shows a series of sequence diagrams illustrating an irrigation controller and an irrigation sensor communicating over a communication circuit. In FIG. 7A, the sequence diagram begins with the controller generating a charging pulse 705a on the communication circuit. The charging pulse may be shorter than a solenoid actuation time threshold. The charging pulse is followed by a delay 710a. The delay 710a can be between 100 milliseconds and 15 (15) seconds. In some implementations, the delay 710a is provided to allow time for internal charges within the solenoid and established by the charging pulse to dissipate. After the delay, the controller may generate one or more addressing pulses on the communication circuit. Pulses 715a represent addressing pulses. The address pulses may also be shorter than a solenoid actuation time threshold. Pulses 715a may represent an address of three (3) in some implementations. In the communication circuit illustrated by the sequence diagram, the flow sensor is configured as address three (3). The flow sensors monitor the address pulses. When a flow sensor recognizes or detects that its address has been encoded on the communication circuit (that is, that the address pulses indicate the sensor's address) the flow sensor may respond by generating an analog signal on the communication circuit. The analog signal may represent a flow measurement of the flow sensor. For example, some implementations of flow sensors may include small generators that generate a voltage signal based on the rate of water flow through the communication circuit. The flow sensor may continue to generate an analog signal representing the water flow until the power in its capacitors has been depleted. This is illustrated by the drop off in the analog signal at the end of signal 720*a*. After the flow measurement signal is complete, the controller may generate one or more long duration solenoid actuation pulses on the communication circuit. This is illustrated by long duration pulse 725*a*.

Figure 7B:
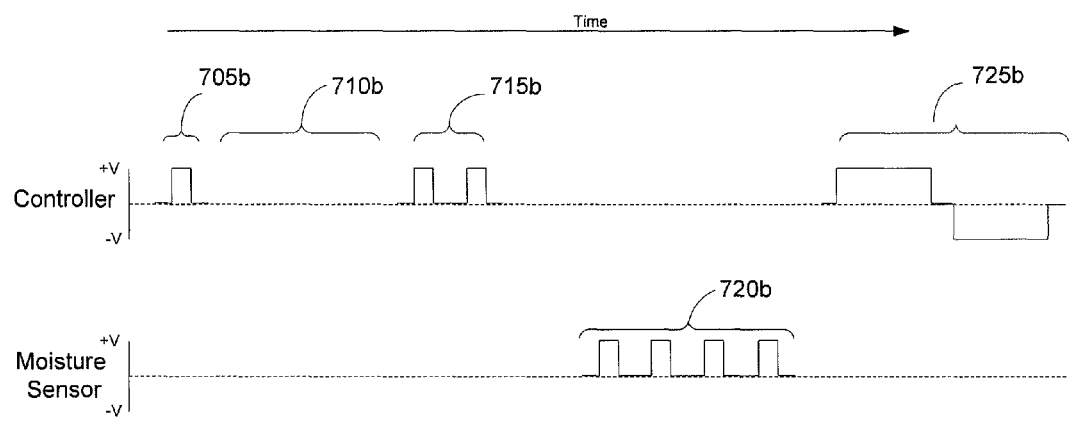

FIG. 7B illustrates an irrigation controller and a moisture sensor communicating over a communication circuit. Similar to FIG. 7A, the irrigation controller generates a charging pulse 705*b*. Charging pulse 705*b* may charge one or more energy storage devices within the moisture sensor (such as one or more capacitors). The controller then waits for a delay time 710*b* before generating addressing pulses 715*b*. In the illustrated implementation of a communication circuit, the moisture sensor may be configured as address two on the communication circuit. In one implementation, a series of two pulses encodes the address of two (2). When the moisture sensor identifies its address on the communication circuit as addressing pulses 715*b*, in the illustrated implementation of FIG. 7B, the moisture sensor responds with digital data encoding a moisture measurement. This is represented as digital data pulses 720*b*. After the moisture sensor completes sending its digitally encoded data, the controller may issue one or more solenoid actuation pulses. This is represented in FIG. 7B by bi-polar pulses 725*b*.

Figure 7C:
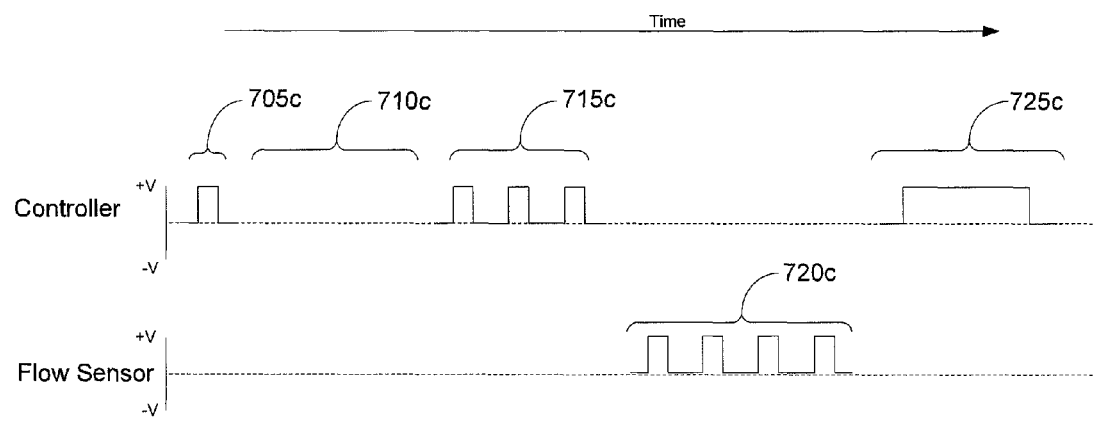

FIG. 7C similarly illustrates communication between an irrigation controller and a flow sensor over a communication circuit. As described previously, the irrigation controller first generates a charging pulse 705*c* on the communication circuit. A delay 710*c* is then provided. The controller then issues a series of addressing pulses that encode the address of a flow sensor. In response, the flow sensor generates digitally encoded flow data as pulses 720*c*. After the flow data has been generated and received by the controller, the controller may issue one or more solenoid actuation pulses, shown as 725*c*.

Figure 7D:
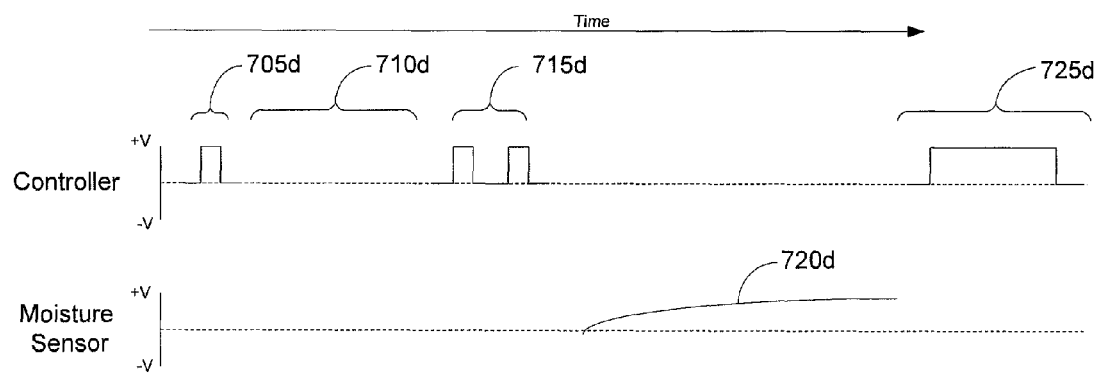

FIG. 7D shows a charging pulse 705*d*, delay 710*d*, and addressing pulses 715*d*. In the illustrated communication circuit, the moisture sensor generates an analog signal 702*d* in response to detecting its encoded address 715*d* on the communication circuit. After the moisture sensor completes generation of its moisture measurement, the irrigation controller of FIG. 7D may generate one or more solenoid actuation pulses, as illustrated by 725*d*.

In any of the processes specifically described above, one or more steps may be added, or a described step deleted, without departing from at least one of the aspects of the invention. Those of ordinary skill in the art would understand that information and signals may be represented using any of a variety of different technologies and techniques. For example, data, instructions, commands, information, signals, bits, and symbols, that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed in various embodiments with a computer, microcontroller, a digital signal microcontroller (DSP), an application specific integrated circuit (ASIC), a field programmable gate array (FPGA) or other programmable logic device, discrete gate or transistor logic, discrete hardware components, or any combination thereof designed to perform the functions described herein. A general purpose microcontroller may be a microcontroller, but in the alternative, a state machine. A microcontroller may also be implemented as a combination of computing devices, e.g., a combination of a DSP and a microcontroller, a plurality of microcontrollers, one or more microcontrollers in conjunction with a DSP core, or any other such configuration.

The steps of a method or algorithm described in connection with the examples disclosed herein may be embodied directly in hardware, in a software module executed by a microcontroller, or in a combination of the two. A software module may reside in RAM memory, flash memory, ROM memory, EPROM memory, EEPROM memory, registers, a hard disk, or any other form of storage medium known in the art. An exemplary storage medium is coupled to the microcontroller such that the microcontroller can read information from, and write information to, the storage medium. In some embodiments, the storage medium may be integral to the microcontroller. The microcontroller and the storage medium may reside in an Application Specific Integrated Circuit (ASIC).

Aspects of the irrigation controller embodiments described herein can beneficially be implemented in a variety of irrigation controllers and irrigation systems. Each embodiment can stand alone, or a plurality of embodiments can be combined to provide greater levels of irrigation control and cost savings. It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

What is claimed is:

1. An irrigation control system, comprising:
a communication circuit;
an irrigation controller comprising
   a processor configured to run an irrigation program;
   an electrical signal generator, configured to
     provide a sensor charging pulse to at least one irrigation sensor over the communication circuit, the sensor charging pulse having a temporal duration less than a solenoid actuation time threshold,
     provide one or more solenoid actuation pulses over the communication circuit, the one or more solenoid actuation pulses having a temporal duration longer than the solenoid actuation time threshold for a solenoid, and
     provide a series of addressing pulses over the communication circuit, the series of addressing pulses indicating a device identifier of one of the at least one irrigation sensors, each one of the series of addressing pulses having a temporal duration shorter than the solenoid actuation time threshold; and a data collection module configured to process a sensor signal received via the communication circuit, wherein the irrigation controller is further configured to execute a control action based on the received sensor signal; and at least one irrigation sensor connected to the communication circuit, each of the at least one irrigation sensors associated with a unique device identifier respectively, each irrigation sensor comprising a charge storage device, wherein the irrigation sensor is configured to receive the sensor charging pulse and charge the charge storage device using the sensor charging pulse, a sensor controller configured to receive the series of addressing pulses and determine if the series of addressing pulses indicates the device identifier of the respective irrigation sensor, the sensor controller further configured to activate the sensor device to provide a sensor signal if the series of addressing pulses indicates the device identifier of the respective irrigation sensor, and a sensor device configured to, when activated, provide a sensor signal indicative of an irrigation condition to the irrigation controller via the communication network.

2. The irrigation control system of claim 1, further comprising a valve actuator comprising a solenoid operably connected to an irrigation valve, the valve actuator configured to receive the one or more solenoid actuation pulses from the irrigation controller via the communication circuit, wherein the valve actuator actuates the solenoid to open or close a valve based on the solenoid actuation pulse.

3. The irrigation control system of claim 2, wherein the communication circuit consists of a first electrical connector and a second electrical connector connecting the irrigation controller, the at least irrigation sensor, and the at least one valve actuator.

4. The irrigation control system of claim 2, wherein the valve actuator comprises a pulse compression and polarity circuit to operate the solenoid.

5. The irrigation control system of claim 1, wherein the at least one irrigation sensor comprises at least one of a rain sensor, a temperature sensor, a moisture sensor, humidity sensor, a radiation sensor, a flow sensor, and a wind sensor.

6. The irrigation control system of claim 1, wherein the duration of the sensor charging pulse is between about 1 millisecond and about 100 milliseconds.

7. The irrigation control system of claim 6, wherein the series of addressing pulses includes between one and ten pulses, and wherein the irrigation controller provides the series of addressing pulses subsequent to a sensor charging pulse.

8. The irrigation control system of claim 1, wherein the duration of the sensor charging pulse is between about 5 milliseconds and about 25 milliseconds.

9. The irrigation control system of claim 1, wherein the duration of the sensor charging pulse is between 9 milliseconds and 11 milliseconds.

10. The irrigation control system of claim 1, wherein the at least one irrigation sensor comprises a first irrigation sensor and a second irrigation sensor, wherein the first irrigation sensor is associated with a first device identifier and the second irrigation device is associated with a second device identifier.

11. The irrigation control system of claim 10, wherein the at least one irrigation sensor further comprises a third irrigation sensor, wherein the third irrigation sensor is associated with a third device identifier.

12. The irrigation control system of claim 1, wherein the one or more solenoid actuation pulses comprise bi-polar pulses.

13. The irrigation control system of claim 1, wherein the series of addressing pulses each have a duration of less than one millisecond.

14. The irrigation control system of claim 1, wherein the control action includes one of raising an alarm signal, actuating a solenoid, deactuating a solenoid, delaying actuation of a solenoid, or adjusting an irrigation time.

15. A method of controlling an irrigation system having an irrigation controller, a valve actuator, and at least one irrigation sensor connected by a communication circuit, the method comprising:

providing a sensor charging pulse over the communication circuit, the sensor charging pulse having a temporal duration less than a solenoid actuation time threshold for a solenoid;

charging a charge storage device in at least one irrigation sensor using the sensor charging pulse;

providing a series of addressing pulses over the communication circuit, the series of addressing pulses indicating a device identifier of one of the at least one irrigation sensors; and activating the at least one irrigation sensor having the device identifier indicated by the series of addressing pulses such that the activated irrigation sensor provides a sensor signal indicative of an irrigation condition to the irrigation controller via the communication circuit.

16. The method of claim 15, wherein the communication circuit consists of a first conductive circuit and a second conductive circuit, the first and second conductive circuits each connected to the irrigation controller, the valve actuator, and each irrigation sensor, wherein the irrigation controller communicates the sensor charging pulse and the series of addressing pulses to the at least one irrigation device using only the first and second conductive circuits, and wherein the sensor device communicates the sensor signal to the irrigation controller using only the first and second conductive circuits.

17. The method of claim 15, further comprising:
receiving the sensor signal in the irrigation controller; and
based on the received sensor signal, provide valve control signals to the valve actuator to open or close a valve.

18. The method of claim 15, further comprising:
receiving the series of addressing pulses in the at least one irrigation sensor; and
determining if the series of addressing pulses indicates the device identifier of the at least one irrigation sensor.

19. The method of claim 15, wherein the at least one irrigation sensor comprises at least one of a rain sensor, a temperature sensor, a moisture sensor, humidity sensor, a radiation sensor, a flow sensor, and a wind sensor.

* * * * *